(12) United States Patent
Palasamudram et al.

(10) Patent No.: US 10,410,269 B2
(45) Date of Patent: Sep. 10, 2019

(54) METHOD, MEDIUM, AND SYSTEM FOR PROVIDING SUBSCRIBER OPTIONS

(71) Applicant: HEWLETT-PACKARD DEVELOPMENT COMPANY, L.P., Houston, TX (US)

(72) Inventors: Shubhada Palasamudram, Bangalore (IN); Dilip Dalton, Sunnyvale, CA (US); Steve Berube, Hampstead, NH (US); Lakshminarayana Mandaleeka, Sunnyvale, CA (US); Serdar Badem, Sunnyvale, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 619 days.

(21) Appl. No.: 14/898,548

(22) PCT Filed: Jul. 31, 2013

(86) PCT No.: PCT/US2013/053076
§ 371 (c)(1),
(2) Date: Dec. 15, 2015

(87) PCT Pub. No.: WO2015/016924
PCT Pub. Date: Feb. 5, 2015

(65) Prior Publication Data
US 2016/0117746 A1    Apr. 28, 2016

(51) Int. Cl.
*G06Q 30/00* (2012.01)
*G06Q 30/06* (2012.01)
(Continued)

(52) U.S. Cl.
CPC ..... *G06Q 30/0621* (2013.01); *G06F 16/2433* (2019.01); *G06F 16/951* (2019.01);
(Continued)

(58) Field of Classification Search
CPC ........... G06Q 30/0621; G06Q 30/0641; G06Q 10/20; G06F 17/30404; G06F 17/30864;
(Continued)

(56) References Cited

U.S. PATENT DOCUMENTS 6,411,697 B1   6/2002   Creamer et al.
7,321,917 B2   1/2008   Durham
(Continued)

FOREIGN PATENT DOCUMENTS

CN   101065729   10/2007
CN   102118430   7/2011
CN   102947797   2/2013

OTHER PUBLICATIONS http://web.archive.org/web/20061221011601/www.adaptiveblue.com/help.html (Year: 2006).*
BMCSoftware, BMC Cloud Lifecycle Management, Managing Cloud Services from Request to Retirement, Solution White Paper, 167 pages, Mar. 31, 2011 http://documents.bmc.com/products/documents/67/49/206749/206749.pdf.
(Continued)

*Primary Examiner* — Matthew E Zimmerman

(57) ABSTRACT

Providing subscriber options can include receiving a message including a selected service design option from a subscriber device, identifying the subscriber based on the message, fetching data pertinent to the selected service design option and the identified subscriber, and providing a set of service design options, dependent to the selected service design option, to the subscriber device based on the data.

19 Claims, 3 Drawing Sheets

(51) Int. Cl.
  *G06F 16/951*   (2019.01)
  *G06F 16/242*   (2019.01)
  *G06Q 10/00*    (2012.01)
  *H04L 12/58*    (2006.01)
  *H04L 29/08*    (2006.01)

(52) U.S. Cl.
  CPC ......... *G06Q 10/20* (2013.01); *G06Q 30/0641* (2013.01); *H04L 51/046* (2013.01); *H04L 67/10* (2013.01)

(58) Field of Classification Search
  CPC . H04L 51/046; H04L 67/10; H04L 29/08171; H04L 41/5054; H04L 47/70; H04L 47/788; H04L 47/822; H04L 47/823; H04L 63/10; H04L 67/1002; H04L 67/101; H04L 67/1012; H04L 67/1029; H04L 67/1078; H04L 67/28; H04L 67/303; H04L 67/34; H04L 2012/5631
  See application file for complete search history.

(56) References Cited

U.S. PATENT DOCUMENTS

| | | |
|---|---|---|
| 8,301,513 B1 | 10/2012 | Peng et al. |
| 8,341,427 B2 | 12/2012 | Auradkar et al. |
| 2003/0229522 A1 | 12/2003 | Thompson et al. |
| 2011/0138050 A1 | 6/2011 | Dawson et al. |
| 2011/0295986 A1 | 12/2011 | Ferris et al. |
| 2012/0131193 A1 | 5/2012 | Ferris et al. |
| 2013/0124360 A1* | 5/2013 | Mitrovic ............ G06Q 30/0611 705/26.4 |
| 2016/0019636 A1* | 1/2016 | Adapalli ............ G06Q 30/0641 705/26.62 |

OTHER PUBLICATIONS

Cisco, Cisco Intelligent Automation for Cloud, Data Sheet, Mar. 2012, 9 pages http://www.google.

International Search Report & Written Opinion, dated Apr. 30, 2014, PCT Patent Application No. PCT/US2013/053076, 9 pages.

* cited by examiner

METHOD, MEDIUM, AND SYSTEM FOR PROVIDING SUBSCRIBER OPTIONS

CROSS-REFERENCE TO RELATED APPLICATION

This application is a U.S. National Stage Application of and claims priority to international Patent Application No. PCT/US2013/053076, filed on Jul. 31, 2013, and entitled "PROVIDING SUBSCRIBER OPTIONS".

BACKGROUND

A cloud service generally refers to a service that allows end recipient computer systems (e.g., thin clients, portable computers, smartphones, desktop computers and so forth) to access a pool of hosted computing and/or storage resources (e.g., the cloud resources) and networks over a network (e.g., the Internet). In this manner, the host, a cloud service provider, may, as examples, provide Software as a Service (SaaS) by hosting applications; Infrastructure as Service (IaaS) by hosting equipment (e.g., servers, storage components, network components, etc.); or a Platform as a Service (PaaS) by hosting a computing platform (e.g., operating system, middleware, data bases, autoscaling infrastructure, etc.).

A typical cloud service incurs charges on a demand basis, is managed by the cloud service provider and may be scaled (e.g., scaled according to desired storage capacity, processing power, network bandwidth and so forth) by the end user. The cloud service may be a public service (e.g., an Internet-based service) that is generally available to all potential users or a limited access private service that is provided over a private network (e.g., a business enterprise network) as well as a managed cloud service—private or hosted—(e.g., a virtual private cloud service) or a hybrid cloud service (a cloud service that is a combination of the above). Traditionally, when a user orders a cloud service, the user may manually perform various actions related to deploying and configuring software associated with the ordered cloud service (e.g., deployment of virtual machines (VMs), middleware, application software, application components, and so forth) on the provisioned/instantiated infrastructure.

DETAILED DESCRIPTION

Figure 1:
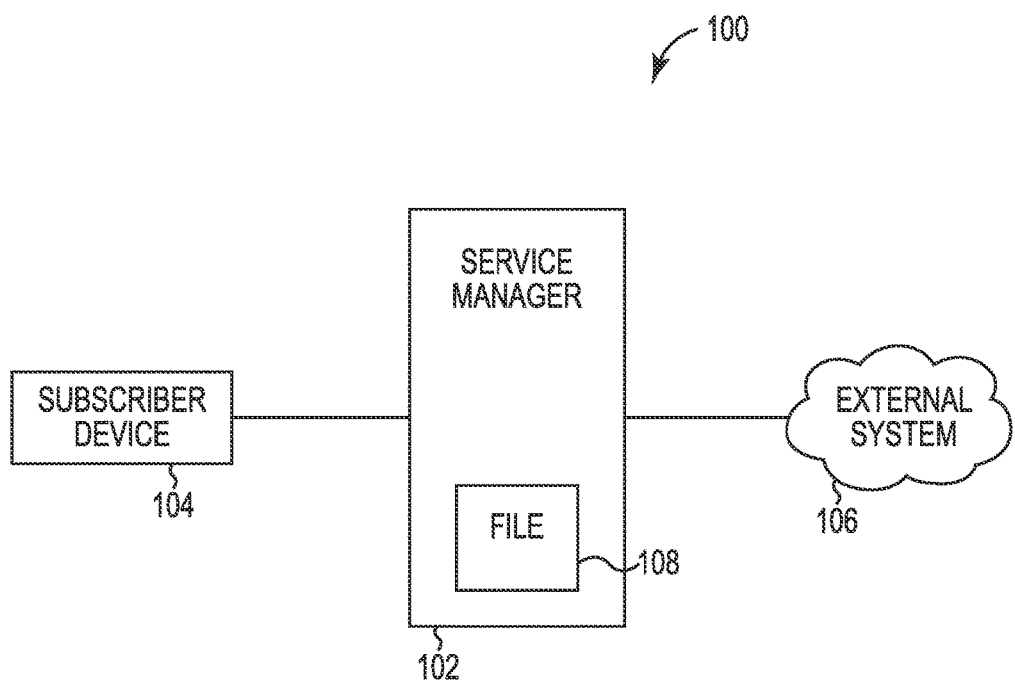
FIG. 1 is a diagram of an example of an environment for providing subscriber options according to the present disclosure.

A service manager can be used to offer and deliver (e.g., instantiate, provision, and deploy) services and manage the lifecycles of cloud services for end users. Managing the lifecycles of cloud services can include managing the building of a cloud service, ongoing management of an existing cloud service, reporting, metering, and/or auditing, for example. A cloud service manager can orchestrate the use of application programming interfaces (APIs) of existing cloud services for managing the lifecycles of the existing cloud services and combinations of the existing cloud services for users of end systems (e.g., desktops, portable computers, smartphones, clients, thin clients, servers).

Depending on the particular implementation, the selection and ordering of cloud lifecycle management services may be performed by a given subscriber (e.g., an administrator) for a group of end subscribers (e.g., users of an enterprise), or the selection and ordering of the cloud capabilities may be performed by a given subscriber (e.g., an Internet-based user or employee) for the given subscriber's individual use. Subscribers of the cloud service manager may select and order cloud capabilities through the cloud service manager. Cloud capabilities, as used herein, refer to existing cloud services, combinations of existing cloud services that are supported by existing cloud resources, as well as lifecycle management services that are offered and delivered by the service manager. The cloud capabilities may be associated with services that are associated with a "cloud", which may be a public cloud (e.g., a cloud formed from an Internet-based network and which provides hosted cloud services that are generally available to members of the public), a private cloud (e.g., a cloud formed from a private, limited access network (such as an enterprise network) which provides hosted cloud services to a limited group of members), a virtual private cloud (e.g., a cloud formed from a public network providing hosted cloud services to a limited group of members), and/or a hybrid cloud (e.g., a cloud formed from a combination of two or more of the aforementioned clouds). Examples of clouds are not so limited, however, and a cloud may include a number of different types of, and/or combinations of, distributed computing systems. As used herein, "a" or "a number of" something can refer to one or more such things.

Some service managers enable subscribers to generate cloud capabilities via subscriber interaction through a subscriber portal or other interface. Such service managers utilize systems to instantiate a cloud capability, and may define optimum resources to perform a particular service.

A cloud service may begin its life as a service design created by a service designer using a service manager (e.g., a platform and/or console). A service design can contain a hierarchy of service components (e.g., the basic building blocks of a service design having the actions, information, and/or restrictions used to deploy a service). As used herein, a service design can include a set of actions to instantiate the cloud capability as well as a collection of resources to be utilized in the instantiation of the cloud capability.

A service designer can construct a service design including a hierarchy of service components, subscriber options and/or custom properties of an orderable cloud-based service. Subscriber options can include various elements of a service design which may be used to provide options presented to a service consumer and/or user (hereinafter referred to as "subscriber") in a cloud subscriber portal. Subscriber options can allow customization of a service at the time of an order, for instance.

Examples herein can allow the subscriber options to be different and/or change (e.g., dynamically) in response to various factors. Such factors can include, for example, an identity of the subscriber (e.g., who the subscriber is), which tenant and/or organization to which the subscriber belongs (in a multi-tenant and/or organization environment), when the subscriber requests a service, where the subscriber desires the service to be created, and/or what options the subscriber may have previously selected.

For example, introduction of new software and/or hardware can provide additional options, whereas obsolescence of existing hardware and/or software can reduce options (e.g., as time progresses after a service definition is made available to a subscriber). A governmental request may require the service to be realized in an environment included in a jurisdiction of where an employer of the subscriber is located, potentially causing changes in options available to the subscriber. "Dynamic options," as used herein, can refer to subscriber options having values presented to the user that are changeable (e.g., over time).

Examples herein allow the provision of particular options to the subscriber based on options previously selected by the subscriber. That is, values of options can be driven by the context surrounding what the subscriber may have already selected (e.g., chosen, input, etc.) using a subscriber device. "Dependent options," as used herein, can refer to subscriber options provided to the subscriber determined to be relevant based on previous subscriber behavior (e.g., option selection).

In some examples, a subscriber can select an option and in response be provided with an option set that includes underlying dependent options. An option set's enablement can be determined by an option's enablement; that is, an option set can be dependent upon the selection of a particular option. Similarly, an option's enablement can be dependent upon the enablement of a particular option set. Thus, the relationship between option set(s) and option(s) can be cyclical in that when an option is selected an underlying dependent option set can be enabled, and the enablement of the option set can enable all options depending from the option set. Enabled options can be provided to a subscriber by being displayed by a subscriber device (e.g., a GUI of a subscriber device), for instance.

One or more options can be selected in various manners and examples of the present disclosure do not limit the selection of options to a particular manner. For example, an option can be selected using a menu (e.g., a drop-down menu) and/or one or more entries made into a Boolean field, among other manners of selecting.

Examples of the present disclosure can enhance an experience of a subscriber by providing relevant options to the subscriber. Relevant options can include options dependent upon previous selections made by the subscriber such that the subscriber is not shown irrelevant, duplicative, and/or otherwise unnecessary options. Relevant options can include updated values for options having a tendency to change in value (e.g., over time). Thus, a subscriber can be provided with timely and accurate options while minimizing (e.g., eliminating) the provision of unnecessary options.

FIG. 1 is a diagram of an example of an environment 100 for providing subscriber options according to the present disclosure. The environment 100 can include a service manager 102 (including a file 108) configured to create a service design for a cloud capability in collaboration with a subscriber using a subscriber device 104. The subscriber device 104 may also be referred to as a subscriber portal. A subscriber device, as referred to herein, can be a computing device (e.g., a computing device as described in connection with FIG. 2B), for instance. A subscriber portal, as referred to herein, can include a framework for integrating information, people, and/or processes through a unified access point (e.g., through a web-based user interface). In some examples, a subscriber portal can be accessed by a subscriber device.

As shown in FIG. 1, environment 100 includes an external system 106. Though a single instance of a service manager 102, a file 108, a subscriber device 104, and an external system 106 are illustrated in FIG. 1, examples of the present disclosure are not so limited. The service manager 102 may communicate with the subscriber device 104 and/or the external system 106 via a network. The network can include one or more of a local area network (LAN), a wide area network (WAN), and/or the Internet. Accordingly, the service manager 102 may reside on an Internet server, on a server within a private LAN, on a server within a WAN, on a desktop computer, and/or may be offered as Software as a Service (SaaS).

Subscriber device 104 can send, and service manager 102 can receive, a message including a selected service design option. The message can be a hypertext transfer protocol (HTTP) request (e.g., HTTP POST request), for instance, responsive to a subscriber selection of a particular option. The request can include one or more key-value pairs (e.g., attribute value pairs) wherein each key-value pair is separated by a particular character (e.g., "&") and each key is separated from its corresponding value by another particular character (e.g., "="). An example of a message can include: param1=value1¶m2=value2&param3=value3. Inclusion of one or more parameters in the message can be subscriber-defined, for instance, and can be used by the subscriber to control a response from the service manager. One or more of the parameters can include an option identifier correlating the message with the particular option (e.g., the selected option).

The service manager 102 can resolve one or more client tokens configured in the message (e.g., configured in the body of the POST request). A client token may identify the subscriber. The service manager 102 can identify (determine an identity of) the subscriber based on the message (e.g., one or more client token(s) of the message). Tokens can be used to determine the tenant and/or organization to which the subscriber belongs (in a multi-tenant and/or organization environment), privileges (e.g., role-based privileges) of the subscriber, when the subscriber requests a service, where the subscriber desires the service to be created, and/or what options the subscriber may have previously selected, among others. Tokens can include a user ID (e.g., provided through user login).

The message can be invoked by the service manager 102 by creating and/or modifying the file 108, for instance. The file 108 can be stored by the service manager 102 and can take various implementations. For example, the file 108 can include service side scripting language (e.g., JSP (JavaServer Pages), PHP, Ruby, etc.).

The service manager 102 (e.g., the file of the service manager 102) can fetch data from the external system 106 pertinent to the selected service design option and/or the identified subscriber. The external system 106 can include various databases, protocols, and/or systems configured to store and/or communicate information associated with one or more service design options and/or the subscriber (e.g., an identity of the subscriber). For example, the external system 106 can include a file, database (human resources database of an organization to which the subscriber belongs), a lightweight directory access protocol (LDAP) store, a pricing system (e.g., SmartBUY), etc.

The fetched data can be processed by the service manager 102 (e.g., by logic of the file 108 of the service manager 102) to determine a set of service design options (e.g., a list of values), dependent to the selected service design option, to provide to the subscriber device 104. The set of service design options can be provided by the service manger 102 to the subscriber device 104 in a particular (e.g., predefined)

format. The set of service design options can be displayed on a user interface of the subscriber device 104 such that each service design option of the set is selectable by the subscriber. Accordingly, the service manager 102 can inspect each of the options being passed back to the subscriber device 104 upon request (message receipt). If the service manager determines that an option is dynamic (by its associated logic), service manager 102 can fetch a plurality of values that can be provided (e.g., presented) to the subscriber at the time of the request.

Figure 2A:
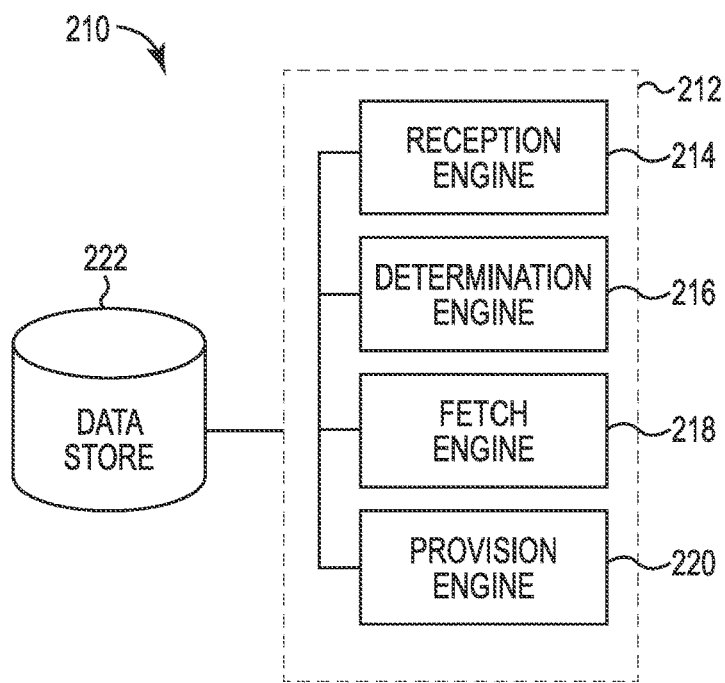
FIG. 2A illustrates a diagram of an example of a system for providing subscriber options according to the present disclosure.
Figure 2B:
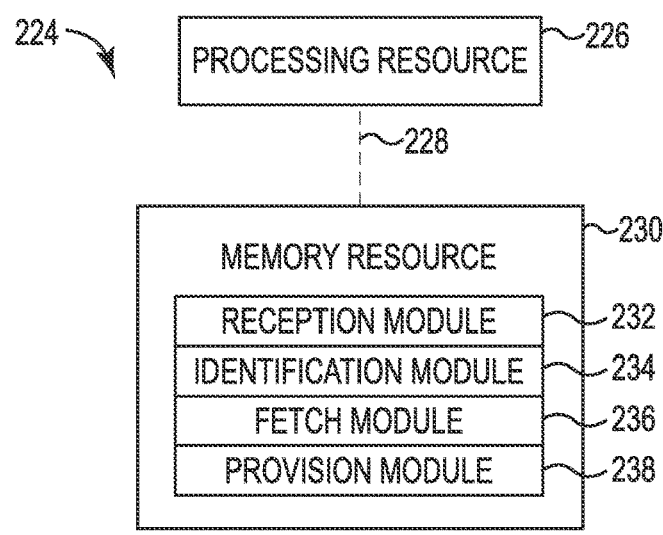
FIG. 2B illustrates a diagram of an example of a computing device according to the present disclosure.

FIGS. 2A-2B illustrate examples of systems 210, 224 according to the present disclosure. FIG. 2A illustrates a diagram of an example of a system 210 for providing subscriber options according to the present disclosure. The system 210 can include a data store 222, a management system 212, and/or a number of engines 214, 216, 218, 220. The management system 212 can be in communication with the data store 222 via a communication link, and can include the number of engines (e.g., reception engine 214, determination engine 216, fetch engine 218, provision engine 220, etc.). The management system 212 can include additional or fewer engines than illustrated to perform the various functions described herein.

The number of engines can include a combination of hardware and programming that is configured to perform a number of functions described herein (e.g., provide the plurality of values to a user interface associated with the subscriber portal). The programming can include program instructions (e.g., software, firmware, etc.) stored in a memory resource (e.g., computer readable medium, machine readable medium, etc.) as well as hard-wired program (e.g., logic).

The reception engine 214 can include hardware and/or a combination of hardware and programming to receive the request from the subscriber (e.g., via a subscriber portal) identifying a service design option. The request can be an HTTP request (e.g., HTTP POST request), for instance, responsive to a subscriber selection of a particular option. The request can include one or more key-value pairs wherein each key-value pair is separated by a particular character (e.g., "&") and each key is separated from its corresponding value by another particular character (e.g., "=").

The determination engine 216 can include hardware and/or a combination of hardware and programming to determine an identity of the subscriber based on a token included in the request. The determination engine 216 can resolve one or more client tokens configured in the message (e.g., configured in the body of the POST request) and/or identify (e.g., determine an identity of) the subscriber based on the message (e.g., one or more client token(s) of the message).

The fetch engine 218 can include hardware and/or a combination of hardware and programming to fetch a plurality of values associated with the service design option from an external system based on the identity of the subscriber. The plurality of values can be pertinent to the selected service design option and/or the identified subscriber, for instance. As previously discussed, the external system can include a database configured to store information associated with the identity of the subscriber.

The provision engine 220 can include hardware and/or a combination of hardware and programming to provide the plurality of values to a user interface associated with the subscriber portal. The fetched values can be processed by the provision engine 220 to determine a set of service design options and/or list of values to provide to the user interface. The plurality of values associated with the service design option can be provided by the provision engine 220 to the user interface in a particular (e.g., predefined) format. The set of service design options can be displayed on a user interface associated with the subscriber portal such that each service design option of the set is selectable by the subscriber (e.g., in a user-selectable format).

FIG. 2B illustrates a diagram of an example of a computing device 224 according to the present disclosure. The computing device 224 can utilize software, hardware, firmware, and/or logic to perform a number of functions herein.

The computing device 224 can be any combination of hardware and program instructions configured to share information. The hardware for example can include a processing resource 226 and/or a memory resource 230 (e.g., computer-readable medium (CRM), machine readable medium (MRM), database, etc.) A processing resource 226, as used herein, can include any number of processors capable of executing instructions stored by a memory resource 230. Processing resource 226 may be integrated in a single device or distributed across multiple devices. The program instructions (e.g., computer-readable instructions (CRI)) can include instructions stored on the memory resource 230 and executable by the processing resource 226 to implement a desired function (e.g., to define a number of rules based on a number of parameter values).

The memory resource 230 can be in communication with a processing resource 226. A memory resource 230, as used herein, can include any number of memory components capable of storing instructions that can be executed by processing resource 226. Such memory resource 230 can be a non-transitory CRM or MRM. Memory resource 230 may be integrated in a single device or distributed across multiple devices. Further, memory resource 230 may be fully or partially integrated in the same device as processing resource 226 or it may be separate but accessible to that device and processing resource 226. Thus, it is noted that the computing device 224 may be implemented on a participant device, on a server device, on a collection of server devices, and/or a combination of the user device and the server device.

The memory resource 230 can be in communication with the processing resource 226 via a communication link (e.g., a path) 228. The communication link 228 can be local or remote to a machine (e.g., a computing device) associated with the processing resource 226. Examples of a local communication link 228 can include an electronic bus internal to a machine (e.g., a computing device) where the memory resource 230 is one of volatile, non-volatile, fixed, and/or removable storage medium in communication with the processing resource 226 via the electronic bus.

A number of modules 232, 234, 236, 238 can include CRI that when executed by the processing resource 226 can perform a number of functions. The number of modules 232, 234, 236, 238 can be sub-modules of other modules. For example, the reception module 232 and the identification module 234 can be sub-modules and/or contained within the same computing device. In another example, the number of modules 232, 234, 236, 238 can comprise individual modules at separate and distinct locations (e.g., CRM, etc.).

Each of the number of modules 232, 234, 236, 238 can include instructions that when executed by the processing resource 226 can function as a corresponding engine as described herein. For example, the reception module 232 can include instructions that when executed by the processing resource 226 can function as the reception engine 214. In another example, fetch module 236 can include instructions that when executed by the processing resource 226 can function as the fetch engine 218.

Figure 3:
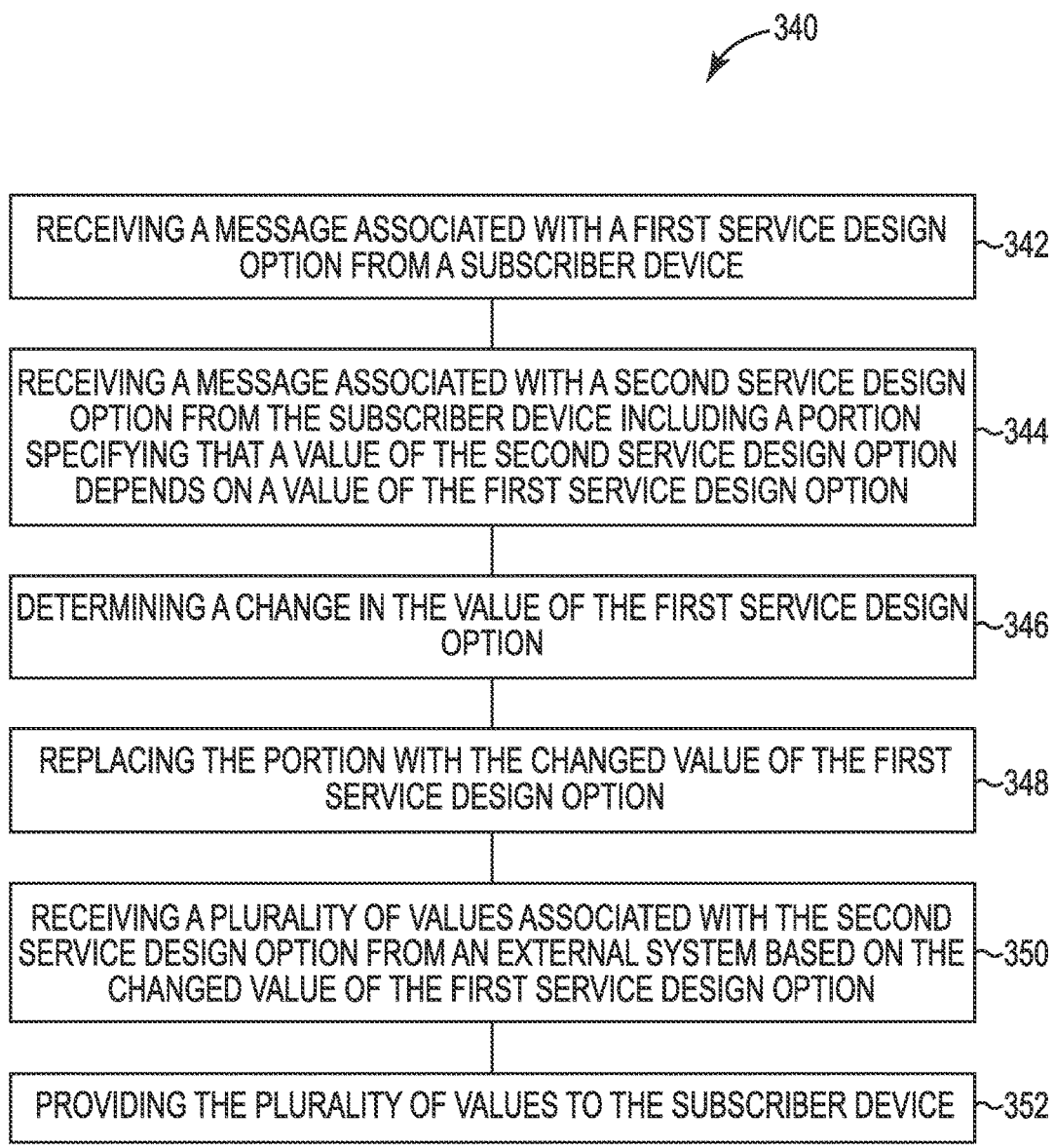
FIG. 3 illustrates a flow chart of an example of a method for providing subscriber options according to the present disclosure.

FIG. 3 illustrates a flow chart of an example of a method 340 for providing subscriber options according to the present disclosure. At 342, the method 340 can include receiving a message associated with a first service design option from a subscriber device. As previously discussed, messages can be received associated with design options.

At 344, the method 340 can include receiving a message associated with a second service design option from the subscriber device including a portion specifying that a value of the second service design option depends on a value of the first service design option. A dynamic option can be made a dependent option using a client token. For example, a client token in one or more parameter values of a message associated with the second service design option can be used to specify that the second service design option is dependent upon a value of the first service design option. An example of a dependent dynamic option configuration (named option2) can include: param1=value1¶m2=value2&param3=[CLIENT:option1]. The configuration "[CLIENT:option1]" can indicate that the value of param3 is to take the value of option1. Thus, depending on a value of option1, the result of option2 can vary. Thus, the second option message can include a plurality of parameters, and a value of one of the parameters can be defined as the value of the first option.

At 346, the method 340 can include determining a change in the value of the first service design option. For example, if a depended-from option (e.g., option1 in the example above) changes in value (e.g., via a user selection) a component can be activated. In some examples, an onchange event associated with the depended-from option can fire when a value associated with the option changes. For example, a script (e.g., JavaScript) can be executed when a value changes. The activation of the component can include checking other options of the page to determine if those options reference the changed option by looking for its client side token (e.g., [CLIENT:option1]) in the message (e.g., checking a plurality of tokens associated with a respective plurality of messages of service design options to determine service design options that reference the first service design option). In one example, the URI(s) of the dynamic option(s) on the page can be checked to determine whether any of the dynamic options reference the changed option by looking for the associated client side token in the POST body. A list of URIs having dynamic options that reference the changed option can be created.

At 348, the method 340 can include replacing the portion (of the message associated with the second service design option) with the changed value of the first service design option. For example, the client side token (e.g., [CLIENT:option1]) can be replaced with the changed (e.g., new) value of the option.

At 350, the method 340 can include receiving a plurality of values associated with the second service design option from an external system based on the changed value of the first service design option. In some examples, asynchronous JavaScript and XML (AJAX) can be used to send the changed value (and other data) to the back end without interfering with a display on the subscriber device, for instance. The changed value that replaced the client side token can be used in fetching one or more values associated with the service design option from an external system in a manner analogous to that previously discussed, for instance.

At 352, the method 340 can include providing the plurality of values to the subscriber device. The changed (e.g., new) option values determined using the changed option can be provided to the subscriber device in a manner analogous to that previously discussed, for instance. Although not illustrated in method 340, it is to be understood that a dependent dynamic option can depend from more than one option. In addition, multiple dynamic options can depend on a single option, for instance.

In the detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process, electrical, and/or structural changes may be made without departing from the scope of the present disclosure.

In addition, the proportion and the relative scale of the elements provided in the figures are intended to illustrate the examples of the present disclosure, and should not be taken in a limiting sense. As used herein, the designators "N" and "P", particularly with respect to reference numerals in the drawings, indicate that a number of the particular feature so designated can be included with a number of examples of the present disclosure.

What is claimed:

1. A non-transitory computer-readable medium storing instructions executable by a processing resource to:
   receive a first message including a selected first service design option from a subscriber device;
   receive a second message associated with a second service design option from the subscriber device, the second message including a portion specifying that a value of the second service design option depends on a value of the first service design option;
   determine a change in the value of the first service design option;
   fetching a plurality of values associated with the second service design option based on the changed value of the first service design option, the plurality of values representing service design options;
   provide, to the subscriber device, the plurality of values representing the service design options;
   responsive to subscriber selection, at the subscriber device, of a service design option of the service design options, create a service design in collaboration with the subscriber device; and
   instantiate a cloud capability using the service design, the cloud capability comprising a service.

2. The non-transitory computer-readable medium of claim 1, wherein the instructions executable to identify the subscriber include instructions to determine a time the message was received; and
   wherein the instructions to provide the plurality of values include instructions to provide the plurality of values representing the service design options based on the time.

3. The non-transitory computer-readable medium of claim 1, wherein the instructions executable to identify the subscriber include instructions to determine a geographic location of the subscriber; and
   wherein the instructions to provide the plurality of values include instructions to provide the plurality of values representing the service design options available in the geographic location.

4. The non-transitory computer-readable medium of claim 1, wherein the service design is a cloud computing service design.

5. A system, comprising:
a processing resource; and
a non-transitory computer-readable medium storing instructions executable by the processing resource to:
receive a first message from a subscriber portal identifying a first service design option;
receive a second message associated with a second service design option from the subscriber portal, the second message specifying that a value of the second service design option depends on a value of the first service design option;
determine a change in the value of the first service design option;
fetch a plurality of values associated with the second service design option from an external system based on the changed value of the first service design option, the plurality of values representing service design options;
provide the plurality of values representing the service design options to a user interface associated with the subscriber portal; and
deploy a cloud service in response to subscriber selection from among the plurality of values.

6. The system of claim 5, wherein the instructions are executable by the processing resource to provide the plurality of values to the user interface in a user-selectable format.

7. The system of claim 5, wherein the first message includes a plurality of key-value pairs.

8. The system of claim 5, wherein the external system includes a database that stores information associated with an identity of a subscriber; and
wherein the instructions are executable by the processing resource to use a service side scripting language to fetch the plurality of values from the database.

9. A method executed by a system comprising a hardware processor, comprising:
receiving a first message associated with a first service design option from a subscriber device;
receiving a second message associated with a second service design option from the subscriber device, the second message including a portion specifying that a value of the second service design option depends on a value of the first service design option;
determining a change in the value of the first service design option;
replacing the portion with the changed value of the first service design option;
fetching a plurality of values associated with the second service design option from an external system based on the changed value of the first service design option, the plurality of values representing service design options;
providing the plurality of values representing the service design options to the subscriber device;
responsive to subscriber selection, at the subscriber device, of a service design option of the service design options, create a service design in collaboration with the subscriber device; and instantiate a cloud capability using the service design, the cloud capability comprising a service.

10. The method of claim 9, wherein the second message includes a plurality of parameters, and wherein a value of one of the parameters is defined as the value of the first service design option.

11. The method of claim 9, comprising:
checking a uniform resource identifier associated with the second service design option to determine whether the second service design option references the changed value of the first service design option; and
replacing the portion with the changed value responsive to a determination that the second service design option references the changed value of the first service design option.

12. The method of claim 9, comprising:
checking a plurality of tokens associated with a respective plurality of messages of service design options to determine service design options that reference the first service design option; and
replacing tokens of service design options that reference the first service design option with the changed value of the first service design option.

13. The non-transitory computer-readable medium of claim 1, wherein the instantiated cloud capability comprises a cloud service.

14. The non-transitory computer-readable medium of claim 1, wherein the instructions are executable by the processing resource to:
replace the portion of the second message with the changed value of the first service design option.

15. The non-transitory computer-readable medium of claim 1, wherein the change in the value of the first service design option is responsive to introduction of new software or hardware, or obsolescence of existing software or hardware.

16. The non-transitory computer-readable medium of claim 1, wherein the instructions are executable to:
identify a subscriber based on the first message;
fetch data pertinent to the first service design option and the identified subscriber, the fetched data comprising the plurality of values.

17. The method of claim 9, wherein the instantiated cloud capability comprises a cloud service and a management service.

18. The non-transitory computer-readable medium of claim 16, wherein the instructions executable to identify the subscriber include instructions to determine an organization to which the subscriber belongs; and
wherein the instructions to provide the plurality of values include instructions to provide the plurality of values representing the service design options authorized by the organization.

19. The non-transitory computer-readable medium of claim 18, wherein the instructions to determine the organization include instructions to determine a role of the subscriber within the organization; and
wherein the instructions to provide the plurality of values include instructions to provide the plurality of values representing the service design options authorized by the organization for the role of the subscriber.

* * * * *